United States Patent
Böhm et al.

(10) Patent No.: US 10,683,942 B2
(45) Date of Patent: Jun. 16, 2020

(54) VACUUM VALVE FOR CLOSING A FLOW PATH WITH A TWO-PART VALVE DISK

(71) Applicant: VAT HOLDING AG, Haag (CH)

(72) Inventors: Christoph Böhm, Gams (CH); Michele Tronca, Jona (CH); Wolfgang Weiss, Hard (AT)

(73) Assignee: VAT HOLDING AG, Haag (CH)

( * ) Notice: Subject to any disclaimer, the term of this patent is extended or adjusted under 35 U.S.C. 154(b) by 0 days.

(21) Appl. No.: 16/079,032

(22) PCT Filed: Feb. 23, 2017

(86) PCT No.: PCT/EP2017/054144
§ 371 (c)(1),
(2) Date: Aug. 22, 2018

(87) PCT Pub. No.: WO2017/144574
PCT Pub. Date: Aug. 31, 2017

(65) Prior Publication Data
US 2019/0056035 A1    Feb. 21, 2019

(30) Foreign Application Priority Data
Feb. 24, 2016  (EP) .................................... 16157098

(51) Int. Cl.
*F16K 3/10* (2006.01)
*F16K 51/02* (2006.01)
(Continued)

(52) U.S. Cl.
CPC ................ *F16K 3/10* (2013.01); *F16K 3/188* (2013.01); *F16K 3/314* (2013.01); *F16K 31/041* (2013.01); *F16K 51/02* (2013.01)

(58) Field of Classification Search
CPC ... F16K 3/10; F16K 3/18; F16K 3/188; F16K 51/02
See application file for complete search history.

(56) References Cited

U.S. PATENT DOCUMENTS 3,145,969 A   8/1964  von Zweck
5,356,113 A  10/1994  Mizuishi et al.
(Continued)

FOREIGN PATENT DOCUMENTS

CN   1987170 B   12/2010
CN   1749609 A    3/2016
(Continued)

OTHER PUBLICATIONS

International Search Report and Written Opinion—PCT/EP2017/054144—ISA/EPO—dated Mar. 10, 2017.
(Continued)

*Primary Examiner* — Reinaldo Sanchez-Medina
*Assistant Examiner* — David Colon-Morales
(74) *Attorney, Agent, or Firm* — Muncy, Geissler, Olds, & Lowe, P.C.

(57) ABSTRACT

A vacuum valve including a valve housing with seat surrounding a first opening with a sealing surface is disclosed. A valve disk having a first disk section and a second disk section tightly mounted inside an outer boundary of the first disk that is movable parallel to an opening axis. A drive is connected to the first disk section. The first disk section includes a first bearing surface configured to contact the sealing surface in the closed position. The outer boundary has a radially inwardly oriented inner surface. The second disk section has a radially outwardly oriented outer surface configured to contact the inner surface sealing a second contact area. At least for determined radial angles about a center of the valve disk, a first radial distance from the center to the first bearing surface is shorter than a second radial distance from the center to the second contact area.

20 Claims, 3 Drawing Sheets

(51) Int. Cl.
*F16K 3/18* (2006.01)
*F16K 3/314* (2006.01)
*F16K 31/04* (2006.01)

(56) References Cited

U.S. PATENT DOCUMENTS

| | | | |
|---|---|---|---|
| 5,577,707 A | 11/1996 | Brida | |
| 6,056,266 A | 5/2000 | Blecha | |
| 6,089,537 A | 7/2000 | Olmsted | |
| 6,416,037 B1 | 7/2002 | Geiser | |
| 6,629,682 B2 | 10/2003 | Duelli | |
| 7,413,162 B2 * | 8/2008 | Geiser | F16K 3/10 251/175 |
| 7,654,505 B2 * | 2/2010 | Schoen | F16K 3/10 251/175 |
| 7,802,772 B2 * | 9/2010 | Geiser | F16K 51/02 251/175 |
| 8,434,511 B2 * | 5/2013 | Williams | F16K 3/06 137/340 |
| 8,550,430 B2 * | 10/2013 | Lamprecht | F16K 51/02 251/175 |
| 8,733,734 B2 * | 5/2014 | Nakamura | F16K 1/2085 251/174 |
| 2005/0067603 A1 | 3/2005 | Lucas et al. | |
| 2006/0049374 A1 | 3/2006 | Ehrne et al. | |
| 2007/0138424 A1 | 6/2007 | Geiser | |
| 2009/0127487 A1 | 5/2009 | Iwabuchi | |
| 2012/0205570 A1 * | 8/2012 | Lamprecht | F16K 1/44 251/359 |
| 2019/0211935 A1 * | 7/2019 | Wada | F16K 3/06 |

FOREIGN PATENT DOCUMENTS

| | | |
|---|---|---|
| DE | 1 264 191 B1 | 3/1968 |
| DE | 77 31 993 U | 1/1978 |
| DE | 34 47 008 C2 | 6/1986 |
| DE | 3720001 A1 | 1/1989 |
| EP | 2 551 564 A1 | 1/2013 |

OTHER PUBLICATIONS

International Preliminary Report on Patentability and Written Opinion of the International Search Report (English), PCT/EP2017/054144—ISA/EPO—dated Aug. 28, 2018.

* cited by examiner

VACUUM VALVE FOR CLOSING A FLOW PATH WITH A TWO-PART VALVE DISK

This application is a 371 National Phase of PCT Application No. PCT/EP2017/054144, filed on Feb. 23, 2017; and this application claims priority of Application No. EP 16157098.1 filed in Europe on Feb. 24, 2016, and which is herein incorporated by reference in its entirety.

TECHNICAL FIELD

The invention relates to a valve for substantially gas-tight interruption of a flow path according to the preamble of claim 1. Such valves, in particular in the form of pendulum valves or slide valves, are mainly used in vacuum technology.

BACKGROUND

In general, vacuum valves for substantially gas-tight closing of a flow path, flow passage or beam path, which leads through an opening formed in a valve housing, are known in different embodiments from the prior art. Vacuum slide valves are used in particular in the field of IC and semiconductor manufacturing but also, for example, in the field of electron microscopy, which must also take place in a protected atmosphere, if possible without the presence of contaminating particles.

For example, in a manufacturing plant for semiconductor wafers or liquid crystal substrates, the highly sensitive semiconductor or liquid crystal elements sequentially pass through a plurality of process chambers in which the semiconductor elements located within the process chamber are processed by means of a processing device, respectively. Both during the processing process within the process chamber, as well as during transport from process chamber to process chamber, the highly sensitive semiconductor elements must always be in a protected atmosphere—especially in a vacuum. The process chambers are connected to each other via connecting passages, for example, wherein the process chambers are opened by means of vacuum slide valves for transferring the parts of the one to the next process chamber and can be closed in a gas-tight manner for performing the respective manufacturing step. As a result of the described field of application, such valves are also referred to as a vacuum transfer valves and also as rectangular slide valves due to their rectangular opening cross-section.

Peripheral valves are used in particular for controlling or regulating the gas flow between a vacuum chamber and a vacuum pump or a further vacuum chamber. Peripheral valves are located, for example, within a piping system between a process vacuum chamber or a transfer chamber and a vacuum pump, the atmosphere or another process vacuum chamber. The opening cross-section of such valves, also called pump valves, is generally smaller than in a vacuum transfer valve. Since peripheral valves are not only used for fully opening and closing an opening, but also for controlling or regulating a flow by continuously adjusting the opening cross-section between a full open position and a gas-tight closed position depending on the application, they are also referred to as control valves. One possible peripheral valve for controlling or regulating the gas flow is the pendulum valve.

In a typical pendulum valve, as known for example from U.S. Pat. No. 6,089,537 (Olmsted), in a first step, a generally round valve disk is rotationally pivoted via an opening, which is generally also round, from an opening-releasing position into an intermediate position covering the opening. In the case of a slide valve, as described for example in U.S. Pat. No. 6,416,037 (Geiser) or U.S. Pat. No. 6,056,266 (Blecha), the valve disk, as well as the opening, is usually rectangular and is pushed linearly in this first step from a position releasing the opening into an intermediate position covering the opening. In this intermediate position, the valve disk of the pendulum or slide valve is located in a spaced opposite position to the valve seat surrounding the opening. In a second step, the distance between the valve disk and the valve seat is reduced, so that the valve disk and the valve seat are pressed uniformly against each other and the opening is closed substantially gas-tight. This second movement is preferably carried out substantially in a direction perpendicular to the valve seat. The sealing can occur, for example, either via a sealing ring arranged on the closure side of the valve disk which is pressed onto the valve seat surrounding the opening, or via a sealing ring on the valve seat, against which the closure side of the valve disk is pressed. Due to the two-step closing process, the sealing ring between the valve disk and the valve seat is hardly subjected to shearing forces that would destroy the sealing ring, since the movement of the valve disk in the second step takes place substantially rectilinearly perpendicular to the valve seat.

Different drive systems are known from the prior art for achieving this combination of a rotary movement in the pendulum valve and translatory movement of the valve disk parallel over the opening and a substantially translational movement perpendicular to the opening, for example from U.S. Pat. No. 6,089,537 (Olmsted) for a pendulum valve and from U.S. Pat. No. 6,416,037 (Geiser) for a slide valve.

The pressing of the valve disk on the valve seat must be such that both the required gas tightness is ensured within the entire pressure range, as well as damage to the sealing medium, in particular the sealing ring in the form of an O-ring or other forms of seals, is avoided by excessive pressure stress. In order to ensure this, known valves provide a controlled contact pressure regulation of the valve disk depending on the pressure difference prevailing between the two valve disk sides. However, especially with large pressure fluctuations or the change from negative pressure to positive pressure, or vice versa, a uniform force distribution along the entire circumference of the sealing ring is not always guaranteed. In general, the aim is to decouple the sealing ring from supporting forces resulting from the pressure applied to the valve. In U.S. Pat. No. 6,629,682 (Duelli), a vacuum valve with a sealing medium is proposed for this purpose, which is composed of a sealing ring and an adjoining support ring, so that the sealing ring is substantially freed of supporting forces.

In order to achieve the required gas-tightness, optionally for both overpressure and negative pressure, additionally or alternatively to the second movement step, some known pendulum valves or slide valves provide a valve ring which can be displaced perpendicularly to the valve disk and surrounds the opening and which for gas-tight closure of the valve is pressed against the valve disk. Such valves with valve rings which are actively displaceable relative to the valve disk are known, for example, from DE 1 264 191 B1, DE 34 47 008 C2, U.S. Pat. No. 3,145,969 (von Zweck) and DE 77 31 993 U. U.S. Pat. No. 5,577,707 (Brida) discloses a pendulum valve having a valve housing with an opening and a valve disk which is pivotable in parallel across the opening for controlling a flow through the opening. A valve ring, which encloses the opening, is vertically movable in the direction of the valve disk by means of several springs and compressed air cylinders. A possible further development of this pendulum valve is proposed in US 2005/0067603 A1 (Lucas et al.).

From EP 2 551 564 A1 (VAT Holding AG), a vacuum valve in various embodiments is known which comprises a two-part valve disk. A first disk section, which carries a radial seal, has an opening. A second disk section is also movably disposed in a radially sealed manner relative to the first disk section. The first disk section is pressed against the valve seat by means of the actuator, so that a sealing contact is formed, wherein the second disk section—in particular in the case of an overpressure on a valve seat side—optionally rests on an opposite valve housing side.

SUMMARY

It can especially be a disadvantage of such an embodiment, in particular, that while the second disk section is supported on an opposite valve housing side at an overpressure in a volume to be sealed, the first disk section has a reduced sealing effect, since this section too is pressed in the direction of the second disk section and can thereby be brought into an open position. The reliability of a seal is thus reduced, especially at high differential pressures or high pressure fluctuations.

It is therefore an object of the invention to solve the problems described above and to provide a valve of the type mentioned that is constructed as simple and compact as possible and is capable of withstanding high pressure loads acting on both sides and is characterized by a low sealing wear, even at high differential pressures and pressure fluctuations.

In particular, it is an object of the invention to provide a vacuum valve, which on the one hand offers a structurally simple design and on the other hand provides an improved sealing effect at high differential pressures and in particular pressure fluctuations.

These objects are achieved by the realization of the characterizing features of the independent claims. Features which further develop the invention in an alternative or advantageous manner can be found in the dependent claims.

The invention is based on providing an at least two-part valve disk with a first, outer disk section and a second, inner disk section, and on forming the first disk section in an axially sealing manner with respect to the valve seat and the second disk section in a radial sealing manner with respect to the first section. The first disk section can be brought in gas-tight contact with the valve seat of the valve housing via an axially acting main seal. The second disk section arranged inside the first disk section is mounted in an axially movable manner relative to the outer disk section in a sealing—in particular gas-tight—manner, wherein between the disk sections a radially acting additional seal is provided. In the closed position of the valve, a pressure difference at the valve disk essentially acts on the movable inner disk section, and the inner disk section is supported substantially decoupled from the outer disk section directly or indirectly on the valve housing.

In addition, the main seal at least partially has a larger radius compared to the additional seal, so that a relevant section of the main seal is located radially further away from a center of the valve disk. In this way, and by a corresponding geometric configuration of the disk sections, a region between the disk sections is defined according to the invention, which causes a generation of a force on the first disk section in the direction of the axial seal in the presence of a relative overpressure on the side of the valve seat, wherein the second disk section provides an axial support of the valve disk. Thus, a reliable retention of the sealing effect can be ensured even with such a prevailing overpressure. In addition, neither the prevailing differential pressure nor a contact pressure acts on the drive of the valve disk, so that neither the drive nor the connection between the drive and the outer disk section is subjected to high forces. This allows a compact and simple construction of the valve with relatively few components.

The vacuum valve according to the invention for substantially gas-tight interruption of a flow path comprises a valve housing having a first wall, which has a first opening for the flow path. The first opening has a geometric opening axis and a valve seat, which encloses the first opening. In other words, the valve seat surrounds the first opening. The first opening and the valve seat are located on a first side of the valve housing. For example, the first side is the side on which a vacuum pump for evacuating a vacuum chamber is connected, while the second side of the valve housing leads to the vacuum chamber. Of course, other applications or arrangements are possible. The first opening has, for example, a circular or oval cross-section or a rectangular cross-section with rounded corners. The geometric opening axis is in particular the central axis of the first opening and is defined, for example, by the longitudinal course of the opening, by the course of a connection arranged at the opening, by the connecting line with an optional second opening of the valve housing or by the surface of the valve seat. A valve seat shall generally be understood functionally as a section in the first wall acting as a sealing surface, on which a further surface (bearing surface) acting as a sealing surface can be positioned. The valve housing can also be formed by the wall alone. The flow path is the regular, blockable flow path of a gaseous or liquid medium through the first opening, optionally a second opening and the valve.

In addition, the valve comprises a valve disk, by means of which the first opening can be closed and opened again. The valve disk has, for example, a round, oval or rectangular cross-section. The dimension of the valve disk allows closing of the first opening by overlapping and placing on the first opening and its valve seat. The valve disk is formed at least in two parts and is divided into two components which are movable axially relative to each other within a range of movement, namely a first, outer disk section and a second, inner disk section.

When radial and axial directions and sealing effects are mentioned in the context of the invention, then this refers generally to directions substantially perpendicular or transverse to the geometric opening axis or substantially parallel to the opening axis. Thus, all directions or straight lines, which lie substantially on a plane to which the opening axis forms a geometric normal line, shall be understood as radial directions or straight lines, even if they do not point directly to or away from the opening axis or intersect the axis of the opening, but for example run askew to this. On the other hand, all directions or straight lines, which run essentially parallel to the opening axis, shall be understood as axial directions or straight lines. Thus, the term "radial" refers not only to a circular cross-section of the opening or the valve disk, including the respective sections, but also to other, for example, rectangular cross-sections. In the latter case, radial is understood as meaning, for example, a direction from the inside to the outside, and vice versa, perpendicular or transverse to the opening axis, and axially as meaning any direction substantially parallel to the opening axis. In the case of movable components, in particular the valve disk, the axial and radial directions relate to a closed state of the valve.

The first disk section is formed in particular annular or frame-like and has an outer boundary. This boundary encloses or surrounds the second disk section, which is formed in a closed manner. A closed disk section is to be understood as meaning that the second disk section forms a closed surface optionally together with other components, so that the second disk section together with the first disk section forms a closure surface by means of which the first opening can be completely covered and closed.

The second disk section is linearly movably mounted within the outer boundary of the first disk section in the direction parallel to the opening axis relative to the first disk section between a retracted position and an extended position in a tight, in particular gas-tight, manner. In other words, the second, inner disk section can be moved freely relative to the first, outer disk section between the retracted and the extended position, wherein in and between these positions there is a gas-tight connection between the inner and outer disk section. Again, in other words, the inner disk section is decoupled within a certain range of movement in the direction of the opening axis of the outer disk section. The retracted position generally means a first position of the inner disk section relative to the outer disk section, while extended position means a second such relative position. Preferably, the retracted position is the position in which the inner disk section is largely surrounded in its axial extension by the outer disk section or around its outer boundary, while the inner disk section is only partially enclosed in the extended position in its axial extension thereof.

The outer boundary of the first disk section has a radially inwardly facing inner surface extending parallel to the opening axis. The second disk section has an outer surface which corresponds to the inner surface of the outer boundary and faces radially outwardly and extends parallel to the opening axis. This outer surface and this inner surface are arranged and formed in such a way that a radially sealing contact between the inner surface of the first disk section and the outer surface of the second disk section exists via an interposed second seal via a second contact region. This radially sealing contact is ensured within the range between the retracted position and the extended position. When speaking generally of a range between two positions, these two positions are also generally included. The second contact region is to be understood as meaning the axially and radially extending region over which a sealing contact between the disk sections can take place.

The radially sealing second seal between the disk sections is designed in particular as an O-ring or vulcanized seal. This second seal may either be arranged on the inner surface of the outer boundary for producing the radially outwardly sealing contact with the outer surface of the second disk section, or it is located on the outer surface of the second disk section for producing the radially inner sealing contact with the inner surface of the outer boundary. However, it is also possible that this seal is purely functional and is formed by a sealing guidance of the outer surface in the inner surface.

The second seal is in particular designed and arranged such that the inner disk section, under non-action of external forces, in particular without the action of a differential pressure on the valve, depending on the mounting position of the valve apart from gravity, is retained in its respective axial position between the retracted and extended position within the outer disk section. In other words, the second seal is preferably such that the inner disk section does not adjust outwardly without mechanical or pressure action.

The second seal can also be functionally formed by a correspondingly tight guidance of the outer surface in the inner surface.

In addition, the valve comprises at least one drive, which is connected to the first, outer disk section and by means of which this first disk section, and thus indirectly the second disk section, can be adjusted both by a transverse movement, as well as by a longitudinal movement. A transverse movement is generally understood to mean a movement substantially perpendicular or transverse to the opening axis, i.e. substantially within a plane to which the opening axis forms a geometric normal, while the longitudinal movement is a movement substantially parallel to the opening axis.

On the one hand, the drive is designed such that the valve disk is pivotable or displaceable between an open position and an intermediate position by means of the transverse movement taking place substantially transversely to the opening axis. This movement can thus be a pivoting movement, in particular on a circular orbit, a linear movement or another movement substantially transversely to the opening axis. In the open position, the valve disk is positioned in a dwell section arranged laterally next to the first opening and releases the first opening and the flow path. This dwell section may be a corresponding section within the valve housing, in particular a parking section for the valve disk, or some other abstract section. In the intermediate position, the valve disk is positioned above the first opening and covers the opening cross-section of the first opening, wherein the valve disk is in spaced opposition to the valve seat. In other words, in the intermediate position in the direction of the opening axis there is a distance between the valve disk and the valve seat. Thus, the first opening in the intermediate position of the valve disk is indeed covered, but not sealed in a gas-tight manner.

On the other hand, the drive is designed such that the valve disk is displaceable between the intermediate position and a closed position by means of the longitudinal movement taking place parallel to the opening axis. In the closed position, there is a tight contact between the first disk section and the valve seat, which closes the first opening tightly, in particular in a gas-tight manner, and which interrupts the flow path. In other words, the vertical distance between the valve disk and the valve seat in the closed position is reduced such that there is a tight contact between the outer disk section and the valve seat and the first opening is completely sealed due to the tight connection between the outer disk section and the flat closed inner disk section. In the closed position, a pressure difference on the valve disk thus essentially acts on the movable second, inner disk section. Due to the free mobility of the second disk section, it is moved when a pressure difference prevails. The valve and the valve disk are designed such that the second disk section is supported in the direction parallel to the opening axis substantially decoupled from the first disk section directly or indirectly on the valve housing. Thus, the differential pressure force on the second disk section substantially acts on the valve housing.

By adopting such a supporting position of the second disk section, an axially expanding section between the first disk section and the second disk section is released, which is connected with the volume to the first opening. This intermediate region is defined in particular at least by a support surface of the first disk section and in particular by the inner surface of the outer boundary. The seal between the disk sections continues to exist. If a relative overpressure and a thus resulting support of the second disk section occur, an axial force is exerted on the support surface of the first disk section in the direction of the valve seat by means of the released area. This force arises due to the relative pressure prevailing in the intermediate region, which thereby presses on the first disk section axially in the direction of the first side and the first opening.

The invention thus further provides that the valve seat has a sealing surface axially directed in the direction of the valve seat and extending transversely to the opening axis. The first disk section has a first bearing surface axially directed in the direction of the valve seat and extending transversely to the opening axis. This first bearing surface and this sealing surface are arranged and formed such that in the closed position there is an axially sealing contact between the first bearing surface and the sealing surface via an intermediate first seal. By means of this axially sealing contact between the first disk section and the valve seat, the gas-tight closure takes place merely by displacement of the first disk section with its first bearing surface on the sealing surface of the valve seat.

The gas-tight contact is thus ensured as long as the first bearing surface, the sealing surface and the first seal are brought into contact.

Since according to the invention the first disk section and thus the first bearing surface are pressed onto the valve seat by the structural configuration of the valve disk in the presence of differential pressure forces, no further forces need to be applied or be absorbed by the drive and the holder to maintain the sealing effect.

This effect is produced by the fact that for certain radial angles about a center of the valve disk, in particular about a center or a center point of the first or second disk section, a first radial distance from the center to the first bearing surface (axial seal) is smaller than a second radial distance from the center to the second contact area (radial seal). In other words, the radially configured sealing arrangement has at least partially a greater radial distance from a center point defined by the valve disk, in particular in the closed position defined by the opening axis, than the axially configured sealing arrangement. In the closed or open state of the valve, in particular, the radial component of the distance from the center to the first contact region is thus smaller than the radial component of the distance from the center to the second contact region.

Only in this way can an area, which effects a force resulting from a relative overpressure in the axial direction, be produced from corresponding shaping of the disk sections on the part of the first disk section, so that the first disk section is pressed onto the valve seat. At the same time, an axial support of the valve disk is provided on the valve housing in both axial directions. In addition, although the disk can be constructed in two parts, it is comparatively simple, i.e. with a small number of components.

As a result of this configuration, the valve seat and the openings of the valve can also be designed to be just as simple, i.e. in general no special topographies on the part of the valve housing are required. As a result, with the proposed solution, a control and a closure of the flow path remain advantageously possible.

In particular, the first disk section may be connected to the at least one drive via an arm which is arranged laterally on the outer disk section and extends perpendicularly to the opening axis such that the arm, in the closed position, is outside the opening cross-section of the first opening geometrically projected along the opening axis. In other words, it is possible to omit an especially star-shaped strut which is arranged on the rear side of the valve disk and which connects the outer disk section to the drive in a central area located near the central axis of the first opening area, as required by the prior art, since no large forces need to be absorbed by the drive arm. The invention provides that the drive arm is arranged only laterally on the outer disk section.

Preferably, the first seal is fixed to the first bearing surface of the first disk section for producing the axially sealing contact with the sealing surface of the valve seat. This has the advantage that the first seal, with the valve fully open, is outside the flow range and thus largely protected from contaminations, which are caused by the medium flowing through the valve. Alternatively, however, there is also the possibility that the first seal is fixed to the sealing surface of the valve seat for producing the axially sealing contact with the first bearing surface of the first disk section. In addition, it is possible that the first seal is arranged on both sections. In particular, the first seal is formed by an O-ring, or other forms of gaskets, which is held in a groove, for example, or by a vulcanized gasket.

The first, outer disk section is formed in an annular manner in a further development of the invention, wherein the second, inner disk section has the shape of a closed circular disk, in particular with lateral flanks in the form of a cylindrical jacket surface on which the outer surface is arranged. Preferably, the sealing surface and the first bearing surface, and/or the inner surface and the outer surface are geometrically an annular surface and a circular cylindrical surface in this embodiment or a general embodiment. Alternatively, it is possible that it concerns a general cylinder jacket surface which extends parallel to the opening axis (in the case of inner surface and outer surface), wherein the base line may have an oval, polygonal or other shape instead of a circular shape.

The first disk section may in particular be of annular design, wherein the diameter of the outer boundary of the first disk section is greater than the diameter of the first bearing surface of the first disk section.

In particular, the valve is a pendulum valve, wherein the drive is preferably designed such that the valve disk is pivotable by means of the transverse movement substantially parallel over the cross-section of the first opening and perpendicularly to the opening axis. However, it is also possible that the valve is a slide valve or a transfer valve, for example of the L-type.

As shown, in the closed position, a pressure difference acts on the valve disk substantially on the movable second, inner disk section, wherein the second disk section is supported directly or indirectly on the valve housing in the direction parallel to the opening axis substantially decoupled from the first, outer disk section.

According to a further development of the invention, the first disk section has a support surface axially directed in a direction to the second disk section (i.e. away from the valve seat and to a second side of the valve housing) and extending transversely to the opening axis and adjacent to the outer boundary, wherein the support surface and the second disk section are formed and arranged such that in the closed position, the inner disk section rests in the retracted position on the support surface at relative negative pressure prevailing on the first side of the first opening.

As a result of the bearing contact of the second disk section, the first disk section is also pressed in the direction of the valve seat under negative pressure on the first side, thereby increasing the sealing effect of the axial seal.

According to one embodiment of the invention, at least the support surface and the underside of the second disk section opposite the support surface, and in particular the inner surface, define boundary surfaces for an intermediate region whose volume is determined as a function of the position of the second disk section, wherein the volume in the retracted position is minimal, in particular zero, and the volume in the extended position is maximum. The volume is connected in the closed position to the first opening. Thus, in the case of an application of a relative overpressure on the first side, the intermediate region opens correspondingly and an effect of the overpressure is also provided in this intermediate region. As a result, the pressure there develops a force in the axial direction. The force acts on the support surface and presses the first disk section in the direction of the valve seat.

The support surface is formed in particular in the radial direction between the first seal and the second seal, so that a corresponding contact pressure of the first disk section is provided on the valve seat.

In particular, the support surface and the first bearing surface overlap in the radial direction.

The first and second disk sections are preferably formed such that the volume of the intermediate section is substantially more radially spaced from the center than the first seal.

The support surface is also arranged in particular at right angles to the outer boundary. In this case, the outer boundary forms a radial boundary of the intermediate area, at least in an extended position.

In an embodiment of the valve disk according to the invention, the second disk section has a recess on its underside facing axially to the valve seat. In addition, the recess may be designed to extend radially in such a way that it overlaps in the radial direction at least partially with both the support surface and in the closed position with the opening cross-section of the first opening, in particular wherein the recess in the second disk section is formed circumferentially. It is understood that the recess may have an alternative shape, dimensions and/or arrangement.

As a result of such an arrangement, there is a connection between the support surface and the first opening already in the closed position and in the retracted position of the second disk section. Possibly occurring pressure fluctuations thus also act directly on the support surface and also generate—in the case of overpressures on the first side—directly corresponding contact forces on the first disk section in the axial direction (in the direction of the valve seat). This leads to the consequence that a sealing effect of the first seal remains ensured even with strong pressure fluctuations.

According to a further development according to the invention, the valve housing has a second wall on a second side opposite the first side, spaced apart from one another. In this second wall, a second opening for the flow path is formed in a spaced, substantially parallel opposite position to the first wall and to the first opening. This second opening has a second opening axis, which preferably corresponds to the opening axis of the first opening. On the second wall there is a second bearing surface, which in particular surrounds the second opening and is opposite the sealing surface in a parallel spaced manner.

The second bearing surface and the second disk section are arranged and designed to limit the relative linear mobility of the second disk section toward the second side and the second opening such that in the closed position the second (inner) disk section, under relative negative pressure prevailing on the second side of the second opening, rests in the extended position with a stop surface in the direction of the second side on the second bearing surface.

In other words, the distance and the position of the second bearing surface on the second wall and the stop surface on the second disk section are such that the second disk section is supported with its stop surface toward the second side on the second bearing surface, as soon as relative negative pressure prevails in the closed position of the valve disk on the second side of the second opening. This position, in which the second disk section is located when resting on the second bearing surface, is the extended position of the second disk section.

An essential requirement of a vacuum valve, which is used in a manufacturing process for semiconductors, is the avoidance of friction particles. Depending on the field of application of the valve, it may be essential that no metal-to-metal contact occurs when opening and closing the valve. Therefore, the second disk section, which rests in the extended position on the second bearing surface, should be brought back into the retracted position before transversely adjusting the valve disk from the intermediate position to the open position, so that a frictional contact of the second disk section on the second bearing surface of the second wall is avoided when transversely adjusting the valve disk between the intermediate position and the open position. This can take place for example by the use of a spring which acts between the second and the first disk section and holds the second disk section in the unloaded state in the retracted position. Such a spring arrangement is known from the closest prior art. A disadvantage of such a spring arrangement is that the complexity of the construction of the valve disk continues to increase and the springs make the cleaning of the valve more difficult. Furthermore, the use of springs increases the risk of particle generation. Instead of springs therefore also other elastically acting elements can be used according to the invention which act between the second and first disk section and exert a force in the direction of retracted position.

Preferably, however, the use of such elastic elements between the disk sections is completely dispensed with. To this end, the invention provides, in particular, that prior to adjusting the valve disk from the closed position to the open position, a relative negative pressure is applied to the valve on the first side of the first opening, so that the second (inner) disk section of the optionally assumed extended position or an intermediate position is moved to the retracted position. Alternatively, a relative overpressure is applied to the second side. However, if the production of such pressure conditions before opening the valve is not possible, the invention provides alternatively that a guide is provided in the valve housing, which is arranged in the valve housing such that the second disk section is guided to the retracted position when the pivoting of the valve disk takes place in the transverse direction from the intermediate position into the open position.

In a preferred, advantageous further development of the invention, the drive is used for returning the second disk section to the retracted position. For this purpose, the at least one drive is designed such that the valve disk is pivotable or displaceable both between the open position and the intermediate position by means of the transverse movement, and is displaceable between the intermediate position, the closed position and an initialization position by means of the longitudinal movement. In the initialization position, the distance of the first disk section from the second wall is reduced such that the second disk section rests with its stop surface on the second bearing surface and is pushed into the retracted position, in particular completely. The intermediate position lies between the closed position and the initialization position, wherein the initialization position lies on the second side, i.e. the side of the second opening, and the closed position on the first side, i.e. the side of the first opening.

To automate the collision-free closing and opening process, the invention provides that the valve has a controller which is designed in such a way and is in such a connection with the drive, in particular control connection, that the valve disk is adjustable for gas-tight interruption of the flow path by means of the transverse movement of the drive from the open position into the intermediate position and by means of the longitudinal movement of the drive from the intermediate position to the closed position. In addition, the controller is designed in such a way and is in connection, in particular control connection, with the drive in such a way that the valve disk is adjustable for complete opening of the flow path by means of the longitudinal movement of the drive from the closed position to the initialization position and then to the intermediate position and by means of the transverse movement of the drive from the intermediate position to the open position.

Before opening the valve, the second disk section can thus be in any position between the retracted position and the extended position, since the second disk section is pushed, especially completely, into the retracted position by the adjustment of the valve disk from the closed position to the initialization position. Thus, a frictional contact or a collision is prevented between the inner disk section and the valve housing, in particular the second bearing surface, thereby avoiding particle generation. Depending on the drive used, the controller may be an electronic, electrical, mechanical, pneumatic, hydraulic or other controller, wherein a suitable transmission is also to be understood as a controller. In particular, the controller is an electronic controller which is in respective electrical signal connection with the electric drive.

According to a specific further development of the invention, the first seal is fixed to the first bearing surface of the first disk section for producing the axially sealing contact with the sealing surface of the valve seat.

The second seal may, for example, be fixed to the inner surface of the first disk section (or its outer boundary) for producing the radially sealing contact with the outer surface of the second disk section or on the outer surface of the second disk section for establishing the radially sealing contact with the inner surface of the first disk section.

In a further embodiment of the invention, the first disk section is connected to the at least one drive via an arm laterally arranged on the first disk section and extending perpendicularly to the opening axis that the arm, in the closed position, is located outside of the opening cross-section of the first opening geometrically projected along the opening axis.

Such an arm can be connected in particular by means of a fixed bearing to the first disk section. Thus, relative translational movements can largely be prevented and the valve has no moving parts at this point, in particular when closing or opening the valve. Preferably, two fixed bearings are provided which are disposed radially opposite on the first disk section.

With regard to the design of the valve disk, according to one embodiment, the first disk section may be designed annularly, the second disk section may be in the form of a closed circular disk, and the inner surface and the outer surface may be geometric circular cylinder jacket surfaces. The first bearing surface and the sealing surface may be formed as annular surfaces.

The vacuum valve is designed, in particular, as a pendulum valve, and the drive is designed in such a way that the valve disk can be pivoted essentially parallel over the cross-section of the first opening and perpendicular to the opening axis by means of the transverse movement.

BRIEF DESCRIPTION OF THE DRAWINGS

The valve system according to the invention is described below purely by way of example with reference to concrete exemplary embodiments shown schematically in the drawings, wherein further advantages of the invention are also discussed. The drawings shown in detail:

FIG. 2a shows a detail view of FIG. 1a;

FIGS. 1a to 4 show a common, exemplary embodiment of a valve according to the invention in different states, from different views and in different degrees of detail. Therefore, these figures will be described together, wherein in some cases reference numerals and features already explained in previous figures will not be discussed again.

DETAILED DESCRIPTION

Figure 1A:
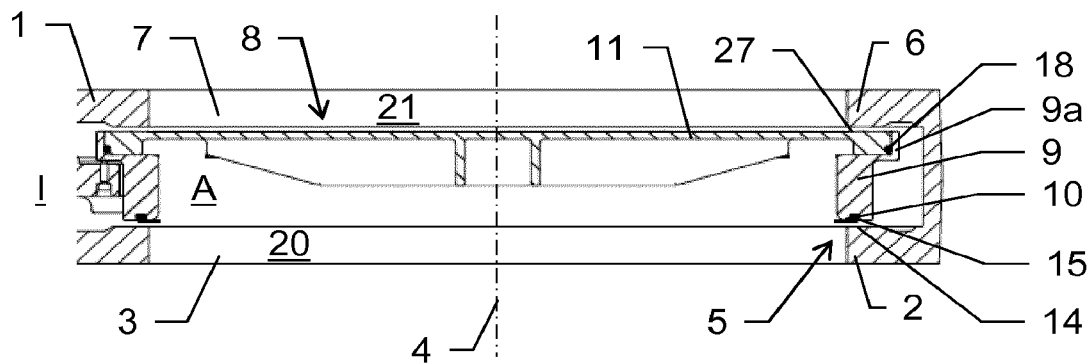
FIG. 1a shows a lateral cross-sectional view of a valve according to the invention in the intermediate position with the inner disk section in the retracted position.

In the FIGS. 1a to 4, a possible embodiment of the valve according to the invention is shown in the form of a pendulum valve. The valve for substantially gas-tight interruption of a flow path F, which is symbolized by arrows in FIG. 4, has a valve housing 1, which has a first opening 3 and an opposite second opening 7. Both openings 3 and 7 have a circular cross-section, but other shapes are possible. In the closed position C of a valve disk 8, FIGS. 1b, 1c, 2b and 2c, the two openings 3 and 7 are separated from each other in a gas-tight manner by means of the valve disk 8, whereas the two openings 3 and 7 are connected to each other in the open position O (FIGS. 3 and 4) of the valve disk 8.

The valve housing 1 is composed in particular of a first wall 2, in which the first opening 3 is formed, and a second wall 6 disposed parallel to the first wall 2, in which the second opening 7 is formed. The first wall 2 is located on a first side 20 of the valve housing 1 and the second wall 6 on a second side 21 of the valve housing 1. The second wall 6 has the second opening 7 for the flow path F, as shown in FIGS. 1a to 2d and 4, in spaced, substantially parallel opposite position to the first wall 2 and the first opening 3.

Both openings 3 and 7 have a common geometric rectilinear opening axis 4, which passes through the geometric center points of the circular openings 3 and 7, as shown in FIGS. 1a to 2d and 4.

The first opening 3 is enclosed by a valve seat 5. This valve seat 5 is formed by a sealing surface 14, which axially faces in the direction of the valve disk 8 and extends transversely to the opening axis 4, has the shape of a circular ring and is formed in the valve housing 1.

In addition, the valve has a valve disk 8 with an annular first disk section 9 and a closed, circular disk-shaped second disk section 11, as shown in FIGS. 1a to 2d and 4.

The first (outer) disk section 9 has a first bearing surface 15 which faces axially in the direction of the valve seat 5 and extends transversely to the opening axis 4 and which has the shape of a circular ring. This first bearing surface 15 has a shape corresponding to the sealing surface 14 of the valve seat 5 and is thus arranged and formed such that in a closed position C of the first disk section 9 of the valve disk 8 there is an axially sealing contact with the sealing surface 14 by means of a first seal 10. The first seal 10 is fixed in the form of an O-ring with a circular cross-section to the first bearing surface 15 of the first disk section 9 for producing the axially sealing contact with the sealing surface 14 of the valve seat 5 in a groove which surrounds the first disk section 9, as shown.

The first disk section 9 also has a structural outer boundary 9a, which allows a bearing of the second disk section 11 within this boundary 9a, wherein an axial mobility of the second disk section 11, in particular parallel to the opening axis 4, is provided.

This outer boundary 9a has an inner surface 16 (FIGS. 1c and 2c), which here has the shape of a geometric circular-cylinder jacket surface.

The second disk section 11 is mounted in a linearly movable and sealed manner within the outer boundary 9a of the first disk section 9 in the direction parallel to the opening axis 4 relative to the first disk section 9 between a retracted position A and an extended position B. For this purpose, the annular outer boundary 9a comprises the inner surface 16 facing radially inwardly and extending parallel to the opening axis 4. The inner surface 16 and the first bearing surface 15 of the outer disk section 9 in particular extend concentric to each other. The second disk section 11 has an outer surface 17 which faces radially outwardly, extends parallel to the opening axis 4 and corresponds with the inner surface 16, said outer surface 17 also having the shape of a geometric circular-cylinder jacket surface. Between this outer surface 17 and the inner surface 16 there is a radially sealing contact in the region between the retracted position A and the extended position B (contact region) via an intermediate second seal 18. This second seal 18 is formed as an O-ring with a circular cross-section. In the embodiment shown, the second seal 18 is fixed in a groove on the outer surface 17 of the second disk section 11 for producing the radially sealing contact with the inner surface 16 of the first disk section 9.

The first disk section 9 is connected to an electric drive 12 (motor) via an arm 28 arranged laterally on the first disk section 9 and extending perpendicular to the opening axis 4. This arm 28 is located in the closed position C of the valve disk 8 outside of the opening cross-section of the first opening 3 which is geometrically projected along the opening axis 4, as is recognizable in FIGS. 1a, 1b, 3 and 4.

Figure 1B:
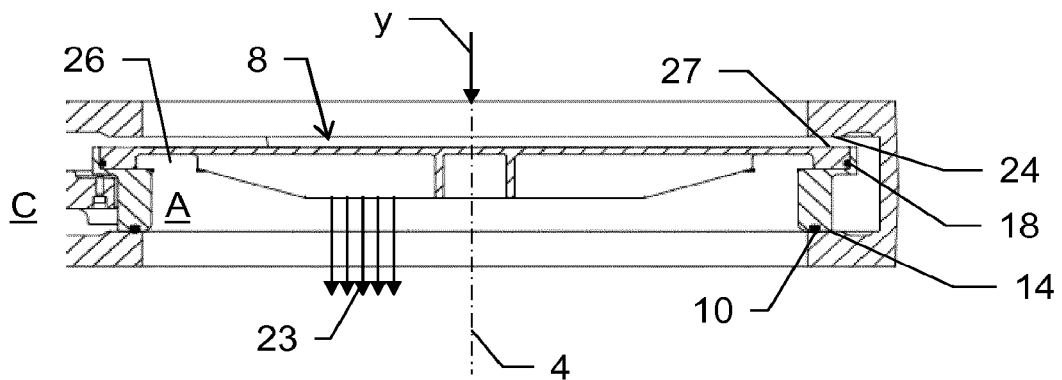
FIG. 1b shows a lateral cross-sectional view of a valve according to the invention in the closed position with the inner disk section in the retracted position.
Figure 1C:
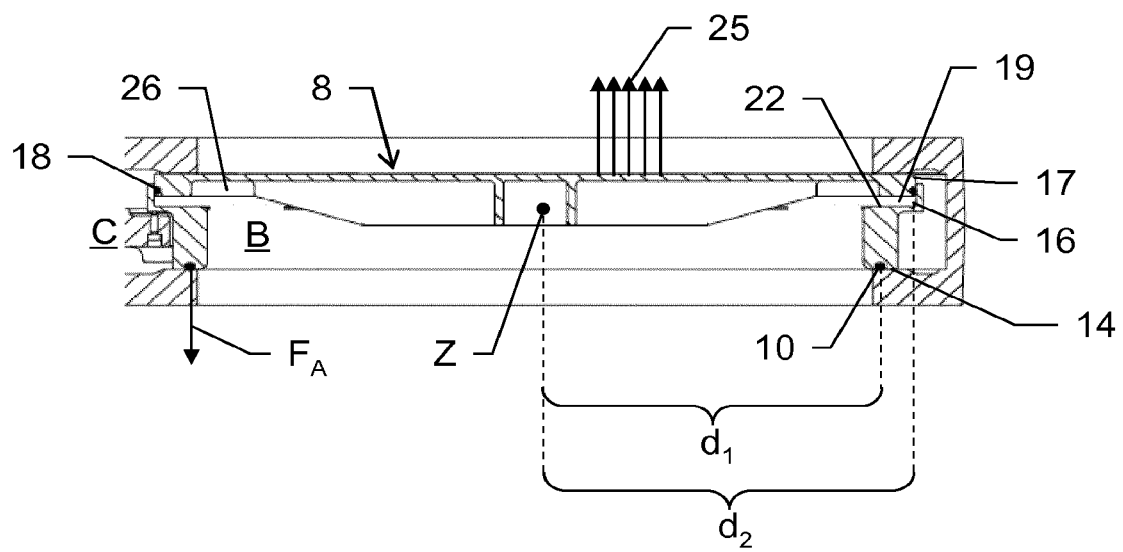
FIG. 1c shows a lateral cross-sectional view of a valve according to the invention in the closed position with the inner disk section in the extended position.
Figure 1D:
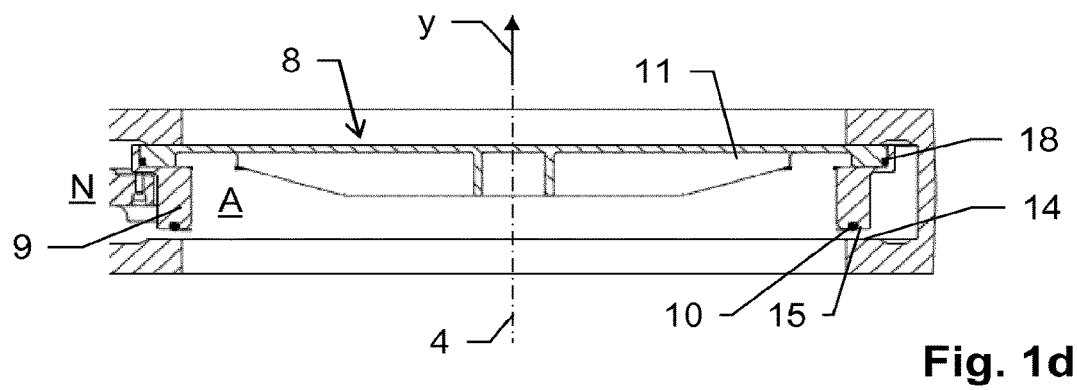
FIG. 1d shows a lateral cross-sectional view of a valve according to the invention in the initialization position with the inner disk section in the retracted position.
Figure 2A:
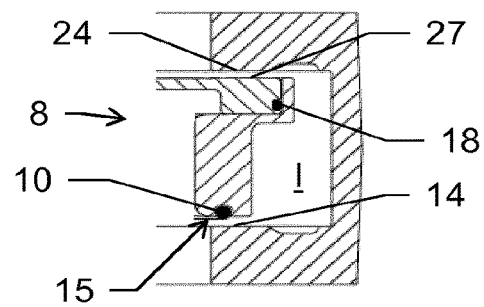
Figure 2B:
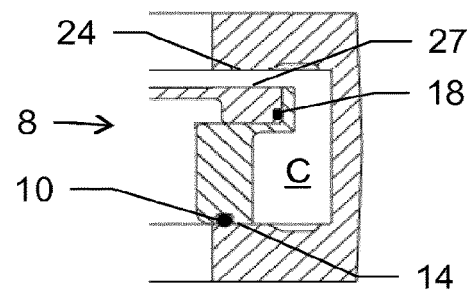
FIG. 2b shows a detail view of FIG. 1b.
Figure 2C:
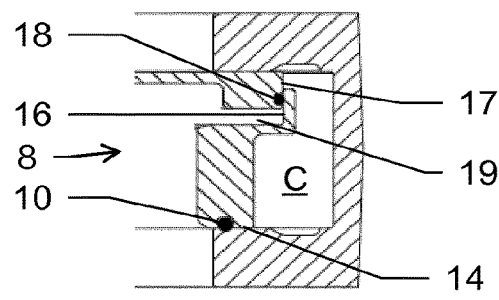
FIG. 2c shows a detail view of FIG. 1c.
Figure 2D:
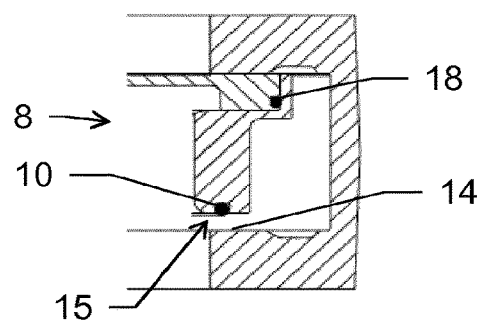
FIG. 2d shows a detail view of FIG. 1d.
Figure 3:
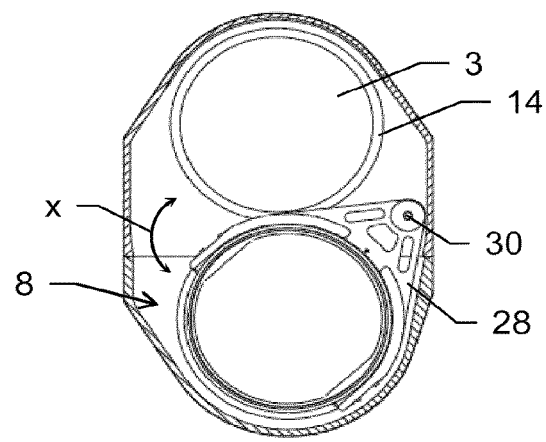
FIG. 3 shows a section through a pendulum valve according to the invention parallel to the valve seat.
Figure 4:
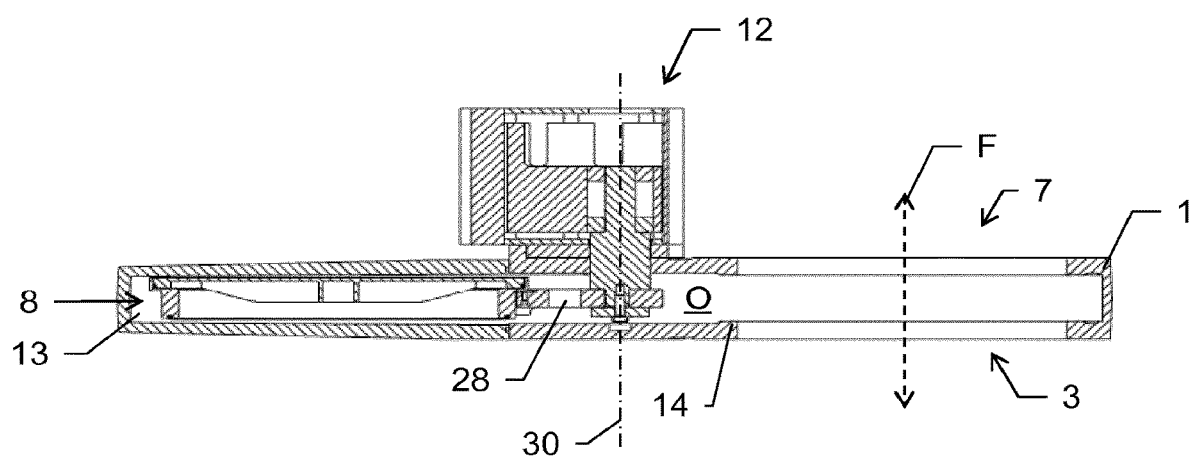
FIG. 4 shows a lateral cross-sectional view of a valve according to the invention in the open position.

An electric drive 12 is formed by using a corresponding transmission such that the valve disk 8—as usual with a pendulum valve—is pivotable by means of the transverse movement x of the drive 12 transversely to the opening axis 4 and substantially parallel over the cross-section of the first opening 3 and perpendicular to the opening axis 4 in the form of a pivoting movement about the pivot axis 30 between an open position O and an intermediate position I, as shown in FIG. 3, and is linearly displaceable by means of a longitudinal movement y of the drive 12 occurring parallel to the opening axis 4, as shown in the FIGS. 1a to 2d. In the open position O, the valve disk 8 is positioned in a dwell section 13 arranged laterally next to the first opening 3, so that the first opening 3 and the flow path F are released (FIG. 4). In the intermediate position I, FIGS. 1a and 2a, the valve disk 8 is positioned over the first opening 3 and covers the opening cross-section of the first opening 3. In the closed position C, FIGS. 1b, 1c, 2b and 2c, the first opening 3 is closed in a gas-tight manner and the flow path F is interrupted in that a gas-tight contact exists between the first bearing surface 15 of the first disk section 9 and the sealing surface 14 of the valve seat 5.

Due to the division of the valve disk 8 into a disk section 9 which is coupled to the drive 12 via the arm 28 and can be brought into gas-tight contact with the valve seat 5 and into a second disk section 11 which is substantially freely movable relative to the first disk section 9 in the direction parallel to the opening axis 4, a pressure difference acts in the closed position C on the valve disk 8 substantially on the movable second disk section 11. In the direction parallel to the opening axis 4, the second disk section 11 is substantially decoupled from the first disk section 9 and is supported directly or indirectly on the valve housing 1.

On the first wall 1, the sealing surface 14 enclosing the first opening 3 is formed in the valve housing 1. This sealing surface 14 is formed by a shoulder extending substantially vertical or radially to the opening axis 4 in the first opening 3. This shoulder 14 is arranged annularly around the first opening 3 and extends substantially along a geometric plane to which the opening axis 4 is a geometric normal. This shoulder thus represents the direction to the sealing surface 14, which faces the first disk section 9, for the first bearing surface 15 of the first disk section 9. The sealing surface 14 and the first disk section 9 are thus arranged and formed such that in the closed position C, the first disk section 9 rests with the first bearing surface 15 in the direction towards the first side 20 on the sealing surface 14, as shown in the FIGS. 1b, 1c, 2b and 2c. The sealing surface 14 of the first wall 2 thus forms a path boundary for the first disk section 9 in the linear adjustment of this outer disk section 9 along the opening axis 4 of the intermediate position I, FIGS. 1a and 2a, in the closed position C, FIGS. 1b and 2b, and thus defines the closed position C of the first disk section 9.

In the starting position, the second disk section 11 is in the retracted position A in the first disk section 9, as shown in FIGS. 1a, 1b, 2a and 2b. A support surface 22 (FIG. 1c) which is formed with the first disk section is used to limit the relative linear mobility of the second (inner) disk section 11 in the direction towards the first side 20 and the first opening 3, on which the second disk section 11, in particular at a relative overpressure on the side of the second opening 7, can rest. This correspondingly causes the second disk section 11 in the closed position C of the first disk section 9 to rest on the first disk section 9 in the retracted position A when the relative overpressure 23 prevails on the first side 20 of the first opening 3, as shown in FIGS. 1b and 2b. Thus, the support surface 22 defines the retracted position A, as shown in FIGS. 1b and 2b. If in the closed position C, in which the first disk section 9 rests with its first bearing surface 15 on the sealing surface 14, as shown in FIGS. 1b and 2b, a relative negative pressure prevails on the first side 20 of the first opening 3, which also means a relative overpressure on the second side 21 of the second opening 7, the second disk section 11 is pressed in the direction towards the first side 20 and the first opening 3. The second disk section 11 rests in the retracted position A on the first disk section 9 in that the second disk section 11 is supported on the support surface 22 of the first disk section 9. Thus, the second disk section 11 is supported indirectly, namely via the first disk section 9, on the sealing surface 14 of the first wall 2 of the valve housing 5, as shown in FIGS. 1b and 2b. As a result of this support of the entire valve disk 8 on the valve housing 1, the arm 28 of the drive 12 and the drive 12 per se is not loaded by the prevailing negative pressure 23, since essentially the entire differential pressure acts on the valve housing 1.

If there is a reversal of the differential pressure in the closed position C, so that a relative negative pressure 25 prevails on the second side 21 of the second opening 7, which also means a relative overpressure on the first side 20 of the first opening 3, a force acts on the valve disk 8 towards the second opening 7 and the second side 21. Thus, the movable second (inner) disk section 11 is moved from its retracted position A into the extended position B in the direction towards the second side 21. In order to also produce a support of the second disk section 11 on the valve housing 1 in this situation too, a second bearing surface 7 surrounding the second bearing surface 24 is formed on the second wall 6, which serves as a bearing surface for the second disk section 11. This second bearing surface 24 extends perpendicularly or radially to the opening axis 4 and extends along a geometric plane, to which the opening axis 4 forms a normal.

The second disk section 11 and the second bearing surface 24 have such corresponding dimensions and are arranged and designed such that a stop surface 27 of the second disk section 11 facing the second side 21 can come to rest on the second bearing surface 24. This arrangement thus serves to limit the relative linear mobility of the second disk section 11 in the direction towards the second side 21 and the second opening 7. If the first disk section 9 is in the closed position C and a relative negative pressure 25 prevails on the second side 21 of the second opening 7, as shown in FIGS. 1c and 2c, the inner disk section 11 moves in the extended position B and rests with said stop surface 27 in the direction towards the second side 21 on the second bearing surface 24. Thus, the second disk section 11 is supported directly on the second bearing surface 24 of the second wall 7 of the valve housing 1, so that even at these pressure ratios, both the drive 12 and the arm 28 of the drive 12 are essentially relieved of forces on the valve disk 8, which prevail on the second side 21 due to the negative pressure 25.

During a positioning of the second disk section 11 in the extended position B or already on leaving the retracted position A, an intermediate section 19 (FIGS. 1c and 2c) is released between the first disk section 9 and the second disk section 11, which is defined and limited at least through the support surface 22 of the first disk section 9 and the underside of the second disk section disposed in opposite position and in particular by the inner surface 16 of the boundary 9a.

When applying a relative overpressure on the first side 20 of the valve 1, this intermediate region 19 ensures that not only does this overpressure act solely on the second disk section 11 and leads to a support of this section 11 on the second wall 6, but also that a pressure is axially generated in the direction of the first side 20 on the first disk section 9. This results in a pressure corresponding to an overpressure on the support surface 22. This creates an axial force $F_A$ in the direction towards the first side 20, which in turn causes a contact pressure of the first disk section 9 on the valve seat 5. Thus, with the present invention, not only an axial support of the valve disk 8 is achieved in the presence of a differential pressure, but also an amplification of the sealing effect when such a differential pressure is present, regardless of whether there is an overpressure or negative pressure.

Since the support surface 22 in this case represents the largest surface of the first disk section 11, which provides a force component $F_A$ resulting from a pressure force in the axial direction, and this support surface 22 is in particular perpendicular to the opening axis, the force which is generated due to an overpressure on the first side 20 in the axial direction on the first disk section 9 is always greatest in the direction of the first side and leads to a contact pressure of the first disk section 9 on the valve seat 5, while the second disk section 11 is supported on the first wall 6.

The invention is based on the structural design of the two disk sections 9 and 11 to each other and the relative arrangement of the two provided seals 10 and 18. The second seal 18 has a larger diameter in the described embodiment than the first seal 10, i.e. the respective associated surfaces of the first disk section 9 (first bearing surface and inner surface) have correspondingly different diameters or distances from a center point Z of the valve disk (in the closed position also from a center point of the first opening). The radial seal is located at least partially radially further away from such center Z than the axial seal (distances $d_1$ and $d_2$ in FIG. 1c).

Due to this enlarged diameter of the radial seal between the first disk section 9 and the second disk section 11 compared to the axial seal between the first disk section 9 and the valve housing, the disk sections 9 and 11 can thus be formed and arranged so that a mentioned support surface 22 is obtained and the improved sealing effect is obtained even at a relative overpressure on the first side 20. At the same time, the valve disk provides axial support in both axial directions depending on the prevailing pressure.

Furthermore, the second disk section 11 has a recess 26, which provides a connection of the support surface 22 with a volume present on the first side 20 also in the retracted position A. As a result, a kind of channel is already formed between the sections in this position A, and a resulting overpressure on this side 20 also acts directly axially on the first disk section 9. In this way, in particular, the risk of loss of the sealing effect under high pressure fluctuations is reduced or prevented.

If, in the closed position C, a relative negative pressure prevails on the second side 21 of the second opening 7 and if the second disk section 11 is in the extended position B, as shown in FIGS. 1c and 2c, the second disk section 11 must be brought back into the retracted position A again before the pivoting of the valve disk 8 from the intermediate position I (FIG. 1a) into the open position O (FIG. 4) in order to prevent a frictional and friction-particle-generating contact between the inner disk section 11 and the second wall 6 when performing the transverse movement x (FIG. 3). For this purpose, the invention provides in this embodiment, that the drive 12, in particular the transmission of the drive 12, is designed such that the valve disk 8 is pivotable between the open position O and the intermediate position I by means of the transverse movement x about the pivot axis 30, and linearly displaceable between the intermediate position I of the closed position C (FIGS. 1b, 1c, 2b and 2c) and an initialization position N (FIGS. 1d and 2d) by means of the longitudinal movement y along the opening axis 4. The intermediate position I lies between the closed position C and the initialization position N.

In the initialization position N, the distance of the outer disk section 9 from the second wall 6 is reduced such that the second disk section 11 rests on the second bearing surface 24 and is pushed completely into the retracted position A. Starting from this initialization position N, the valve disk 8 can be moved with the second disk section 11 in the retracted position A linearly into the intermediate position I by means of the drive 12 and pivoted from there into the open position O by means of the pivoting transverse movement x, without there being a collision between the second disk section 11 and the valve housing 1.

In order to enable automated opening and closing of the valve, the valve provides an electronic controller, which is designed and is in communication with the drive 12 and the transmission in such a way that the valve disk 8 is accordingly adjustable for gas-tight interruption of the flow path F and complete opening of the flow path F. For gas-tight interruption of the flow path F, the valve disk 8 is adjustable by the controller by means of the transverse movement x of the drive 12 from the open position O to the intermediate position I and by means of the longitudinal movement y of the drive 12 from the intermediate position I to the closed position C. For the complete opening of the flow path F, the valve disk 8 is adjustable by the controller 29 by means of the longitudinal movement y of the drive 12 from the closed position C, in which the second disk section 11 is in a random position between the retracted position A and the extended position B, via the initialization N for the complete sliding of the inner disk section 11 into the retracted position B in the intermediate position I and from there by means of the transverse movement x of the drive 12 from the intermediate position I into the open position O.

Alternatively, there is the possibility that the initialization position I is approached even when closing the valve. In particular, in the case of a non-electronic controller, this may be advantageous for simplifying the structure of the controller. In this case, the sequence of movement of the valve disk 8 when closing corresponds to the one when opening.

In the present embodiment, the drive 12 is designed as an electric motor, wherein the transmission is switchable such that driving the drive 12 causes either the transverse movement x or the longitudinal movement y. The drive 12 and the transmission are electronically controlled by the controller. Thus, it is possible, by means of an input signal supplied to the controller, which dictates the adjustment direction, i.e. opening or closing, to allow the movement sequence of the valve disk 8 to be carried out automatically. Alternatively, there is the possibility that the controller is formed by the transmission, wherein—in particular depending on the adjustment direction of the drive 12—the individual positions are approached. Such transmissions, in particular with slide circuits, are known from the prior art. Furthermore, it is possible to use several drives for effecting the transverse movement x and the longitudinal movement y, wherein the controller takes over the control of the drives.

The pendulum valve described is particularly suitable for use as a control valve, wherein the precise control of the flow is possible not only by pivoting adjustment of the valve disk 8 between the open position O and the intermediate position I by means of the transverse movement x, but especially by linear adjustment of the valve disk 8 along the opening axis 4 between the intermediate position I, the closed position C and the initialization position N by means of the longitudinal movement y. As a result, the described pendulum valve can also be used for precise control tasks. In the case of a molecular instead of a laminar flow, the forces acting on the valve disk 8 during normal operation are so small that the second disk section 11 can be retained by the second seal 18 and does not move. Due to a damping of the valve disk 8 in particular by the elastic seals 10 and 18, a vibration or flutter of the inner disk section 11 can be avoided.

It is understood that the illustrated figures represent only possible embodiments schematically. The various approaches can also be combined with each other according to the invention as well as with methods and devices for closing volumes under vacuum conditions of the prior art.

What is claimed is:
1. A vacuum valve for substantially gas-tight interruption of a flow path, comprising
  a valve housing having a first wall which has a first opening for the flow path with a geometric opening axis and a valve seat enclosing the first opening on a first side of the valve housing,
  a valve disk having
    in particular an annular or frame-like first disk section with an outer boundary and
    a closed second disk section which is linearly movably mounted in a sealed manner within the outer boundary in the direction parallel to the opening axis relative to the first disk section between a retracted position and an extended position,
  at least one drive which is connected to the first disk section and which is formed such that the valve disk is pivotable or displaceable between
    an open position, in which the valve disk is positioned in a dwell section arranged laterally next to the first opening and releases the first opening and the flow path, and
    an intermediate position, in which the valve disk is positioned above the first opening and covers the opening cross-section of the first opening, by means of a transverse movement taking place substantially transversely to the opening axis, and is displaceable between
    the intermediate position and
    a closed position, in which there is a gas-tight contact between the first disk section and the valve seat which closes the first opening in a gas-tight manner and interrupts the flow path, by means of a longitudinal movement taking place parallel to the opening axis,
  wherein in the closed position a pressure difference on the valve disk acts substantially on the movable second disk section and the second disk section is supported directly or indirectly on the valve housing in the direction parallel to the opening axis substantially decoupled from the first disk section, wherein
    the valve seat has a sealing surface facing axially in the direction of the valve disk and extending transversely to the opening axis,
    the first disk section has a first bearing surface facing axially in the direction of the valve seat and extending transversely to the opening axis, which is arranged and formed such that in the closed position via an intermediate first seal there is an axially sealing contact with the sealing surface in a first contact area,
    the outer boundary has an inner surface facing radially inwards and extending parallel to the opening axis,
    the second disk section has an outer surface facing radially outwards and extending parallel to the opening axis, which is arranged and formed such that via an intermediate second seal a radially sealing contact is achieved with the inner surface via a second contact area between the retracted position and the extended position, and at least for certain radial angles about a center of the valve disk a first radial distance from the center to the first bearing surface is smaller than a second radial distance from the center to the second contact area.

2. The vacuum valve according to claim 1, wherein the first disk section comprises a support surface
which faces axially in a direction towards the second disk section and extends transversely to the opening axis and
which adjoins the outer boundary,
wherein the support surface and the second disk section are arranged such that in the closed position the second disk section, with relative negative pressure prevailing on the first side of the first opening, rests in the retracted position on the support surface.

3. The vacuum valve according to claim 2, wherein at least the support surface and the underside of the second disk section opposite the support surface define boundary surfaces for an intermediate region, the volume of which
is determined depending on the position of the second disk section, wherein the volume is minimal in the retracted position, in particular zero, and the volume is maximal in the extended position, and
is connected to the first opening in the closed position.

4. The vacuum valve according to claim 2, wherein the support surface is formed in the radial direction between the first seal and the second seal.

5. A valve according to claim 2, wherein the support surface and the outer boundary are arranged at right angles relative to each other.

6. The valve according to claim 1, wherein the second disk section has a recess on its underside facing axially to the valve seat, wherein the recess is designed to extend radially in such a way that in the radial direction it at least partially overlaps with both the support surface as well as in the closed position with the opening cross-section of the first opening, in particular wherein the recess is formed circumferentially in the second disk section.

7. The valve according to claim 1, wherein the first disk section is formed annularly and the diameter of the outer boundary of the first disk section is greater than the diameter of the first bearing surface of the first disk section.

8. The valve according to claim 1, wherein
the valve housing has on a second side a second wall which, in a spaced, substantially parallel opposite position to the first wall and the first opening, has a second opening for the flow path,
the second wall has a second bearing surface, in particular enclosing the second opening, and
the second bearing surface and the second disk section are arranged and formed for limiting the relative linear mobility of the second disk section in the direction towards the second side and towards the second opening such that in the closed position the second disk section, with relative negative pressure prevailing on the second side of the second opening, rests in the extended position with a stop surface in the direction towards the second side on the second bearing surface.

9. The valve according to claim 1, wherein the at least one drive is designed such that the valve disk is pivotable or displaceable between
the open position, and
the intermediate position,
by means of the transverse movement, and is displaceable between
the intermediate position,
the closed position and
an initialization position,
in which the distance of the first disk section from the second wall is reduced such that the second disk section rests with its stop surface on the second bearing surface and is pushed completely into the retracted position, by means of the longitudinal movement, wherein the intermediate position is located between the closed position and the initialization position.

10. The valve according to claim 1, wherein a controller which is designed and in connection with the drive in such a way that the valve disk is adjustable for gas-tight interruption of the flow path
by means of the transverse movement of the drive
from the open position
into the intermediate position, and
by means of the longitudinal movement of the drive
from the intermediate position
into the closed position
and for full opening of the flow path
by means of the longitudinal movement of the drive
from the closed position, in which the second disk section is in a random position between the retracted position and the extended position,
via the initialization position for completely pushing the second disk section into the retracted position
into the intermediate position, and
by means of the transverse movement of the drive
from the intermediate position
into the open position.

11. The valve according to claim 1, wherein the first seal is fixed to the first bearing surface of the first disk section for producing the axially sealing contact with the sealing surface of the valve seat.

12. The valve according to claim 1, wherein the second seal is fixed
to the inner surface of the first disk section for producing the radially sealing contact with the outer surface of the second disk section or
to the outer surface of the second disk section for producing the radially sealing contact with the inner surface of the first disk section.

13. The valve according to claim 1, wherein the first disk section is connected to the at least one drive via an arm which is arranged laterally on the first disk section and extends perpendicularly to the opening axis, such that the arm is disposed in the closed position outside of the opening cross-section of the first opening projected geometrically along the opening axis.

14. The valve according to claim 1, wherein
the first disk section is formed annularly,
the second disk section has the shape of a closed circular disk,
the inner surface and the outer surface are geometric circular cylinder jacket surfaces, and
the sealing surface and the first bearing surface are geometric annular surfaces.

15. The valve according to claim 1, wherein
the valve is designed as a pendulum valve and
the drive is designed such that the valve disk is pivotable by means of the transverse movement substantially parallel over the cross-section of the first opening and perpendicular to the opening axis.

16. The valve according to claim 1, wherein the second disk section is configured to be moved freely relative to the first disk section between the retracted and the extended positions, wherein in and between the retracted and the extended positions there is a gas tight connection between the first and the second disk sections.

17. The valve according to claim 2, wherein the second disk section is configured to be moved freely relative to the first disk section between the retracted and the extended positions, wherein in and between the retracted and the extended positions there is a gas tight connection between the first and the second disk sections.

18. The valve according to claim 8, wherein the second disk section is configured to be moved freely relative to the first disk section between the retracted and the extended positions, wherein in and between the retracted and the extended positions there is a gas tight connection between the first and the second disk sections.

19. The valve according to claim 10, wherein the second disk section is configured to be moved freely relative to the first disk section between the retracted and the extended positions, wherein in and between the retracted and the extended positions there is a gas tight connection between the first and the second disk sections.

20. The valve according to claim 14, wherein the second disk section is configured to be moved freely relative to the first disk section between the retracted and the extended positions, wherein in and between the retracted and the extended positions there is a gas tight connection between the first and the second disk sections.

* * * * *